US009866390B2

(12) United States Patent
Chen (10) Patent No.: US 9,866,390 B2
(45) Date of Patent: Jan. 9, 2018

(54) DATA TRANSMITTING METHOD SUITABLE TO CLIENT AND SERVER, DATA TRANSMITTING SYSTEM AND DATA TRANSMITTING METHOD FOR CLIENT SUITABLE TO TRANSMIT AND RECEIVE DATA TO AND FROM SERVER

(71) Applicants: ThroughTek Technology (ShenZhen) Co., Ltd., Longhua New District, Shenzhen (CN); ThroughTek Co., Ltd., Taipei (TW)

(72) Inventor: I-Fan Chen, Taipei (TW)

(73) Assignees: THROUGHTEK TECHNOLOGY (SHENZHEN) CO., LTD., Shenzhen (CN); THROUGHTEK CO., LTD., Taipei (TW)

( * ) Notice: Subject to any disclaimer, the term of this patent is extended or adjusted under 35 U.S.C. 154(b) by 105 days.

(21) Appl. No.: 14/946,812

(22) Filed: Nov. 20, 2015

(65) Prior Publication Data

US 2016/0218877 A1    Jul. 28, 2016

(30) Foreign Application Priority Data

Jan. 22, 2015    (TW) .............................. 104102126 A (51) Int. Cl.
| | |
|---|---|
| H04L 9/32 | (2006.01) |
| G06F 21/00 | (2013.01) |
| G06F 7/04 | (2006.01) |
| H04L 9/00 | (2006.01) |
| H04L 29/06 | (2006.01) |

(52) U.S. Cl.
CPC ........ *H04L 9/3242* (2013.01); *H04L 63/0435* (2013.01); *H04L 63/12* (2013.01); *H04L 2209/24* (2013.01)

(58) Field of Classification Search
CPC ... H04L 9/3242; H04L 63/12; H04L 63/0435; H04L 2209/24
USPC ....................... 713/168, 182; 726/5; 380/262
See application file for complete search history.

(56) References Cited

U.S. PATENT DOCUMENTS

| | | | |
|---|---|---|---|
| 7,694,335 B1 * | 4/2010 | Turner ................ | H04L 63/1441 708/250 |
| 9,443,108 B1 * | 9/2016 | Roth ...................... | G06F 21/70 |
| 2005/0149730 A1 * | 7/2005 | Aissi ...................... | G06F 21/31 713/168 |
| 2008/0082648 A1 * | 4/2008 | Ahmed ................ | H04L 63/126 709/223 |

* cited by examiner

*Primary Examiner* — Aravind Moorthy
(74) *Attorney, Agent, or Firm* — Juan Carlos A. Marquez; Marquez IP Law Office, PLLC (57) ABSTRACT

A data transmitting method suitable to a client and a server is provided. The method includes the following steps. The client generates an initial value. The server generates a first time in response to the initial value. The client generates a second time and a first verification hash code related with the first time and the second time. The server generates a random variable and a second verification hash code related with the first time, the random variable and the first verification hash code. The client generates a first transmitting data and a third verification hash code related with the first transmitting data, the first verification hash code and the second verification hash code. The server generates a first response message and a fourth verification hash code related with the first response message, the second verification hash code and the third verification hash code.

20 Claims, 11 Drawing Sheets

DATA TRANSMITTING METHOD SUITABLE TO CLIENT AND SERVER, DATA TRANSMITTING SYSTEM AND DATA TRANSMITTING METHOD FOR CLIENT SUITABLE TO TRANSMIT AND RECEIVE DATA TO AND FROM SERVER

CROSS REFERENCE TO RELATED APPLICATION

This application claims the priority benefit of Taiwan Patent Application Serial Number 104102126, filed on Jan. 22, 2015, the full disclosure of which is incorporated herein by reference.

BACKGROUND

Technical Field

This disclosure generally relates to a data transmitting method and, more particularly, to a data transmitting method and system suitable to the client and the sever and a data transmitting method for the client.

Related Art

Generally, there is a requirement for transmitting data between the server and the client. In order to avoid repeating sending the copying package and increase the accuracy for transmitting data, the verification by using the encryption key is required. The verification manner includes the time verification manner, the encryption key exchange manner and so on.

In the traditional time verification manner, it must synchronize the time. Thus an error on transmitting time and processing speed occurs such that the protection of the time verification manner is limited. Additionally. In the encryption key exchange manner, it takes a long time for handshaking and exchanging the key such that the efficiency of the system decreases and the loading of the system increases. Therefore, the data transmitting method between the server and the client needs improvement.

SUMMARY

The disclosure provides a data transmitting method and system and a data transmitting method for a client, thereby increasing a security for transmitting data.

The disclosure provides a data transmitting method suitable to a client and a server. The data transmitting method includes the following steps: generating an initial value by the client; generating a first time in response to the initial value by the server; generating a second time and a first verification hash code by the client, wherein the first verification hash code is related with the first time and the second time; generating a random variable and a second verification hash code by the server, wherein the second verification hash code is related with the first time, the random variable and the first verification hash code; generating a first transmitting data and a third verification hash code by the client, wherein the third verification hash code is related with the first transmitting data, the first verification hash code and the second verification hash code; and generating a first response message and a fourth verification hash code by the server, wherein the fourth verification hash code is related with the first response message, the second verification hash code and the third verification hash code.

The disclosure further provides a data transmitting system. The data transmitting system includes a client and a server. The client generates an initial value. The server generates a first time in response to the initial value. The client generates a second time and a first verification hash code in response to the first time, wherein the first verification hash code is related with the first time and the second time. The server generates a random variable and a second verification hash code in response to the second time and the first verification hash code, wherein the second verification hash code is related with the first time, the random variable and the first verification hash code. The client generates a first transmitting data and a third verification hash code in response to the random variable and the second verification hash code, wherein the third verification hash code is related with the first transmitting data, the first verification hash code and the second verification hash code. The server generates a first response message and a fourth verification hash code in response to the first transmitting data and the third verification hash code, wherein the fourth verification hash code is related with the first response message, the second verification hash code and the third verification hash code.

The disclosure further provides a data transmitting method for a client suitable to transmit and receive data to and from a server. The data transmitting method for the client includes the following steps: generating an initial value; generating a second time and a first verification hash code according to a first time is transmitted from the server in response to the initial value, wherein the first verification hash code is related with the first time and the second time; generating a first transmitting data and a third verification hash code according to a random variable and a second verification hash code are transmitted from the server in response to the second time and the first verification hash code, wherein the second verification hash code is related with the first time, the random variable and the first verification hash code, and the third verification hash code is related with the first transmitting data, the first verification hash code and the second verification hash code.

According to the data transmitting method and system and the data transmitting method for the client in the exemplary embodiments, after receiving the message (such as the first time or verification hash code) transmitted from the server, the client generates the corresponding message (such as the transmitting data or the corresponding verification hash code) accordingly and after receiving the message (such as the second time, the verification hash code or the transmitting data) transmitted from the client, the server generates the corresponding message (such as the response message or the corresponding verification hash code) accordingly. Therefore, the connect verifications are independent, the copying package and the repeating attack may be avoided, and the message is not resent before the response is received, so as to increase the accuracy for transmitting data.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The following description is of the best-contemplated mode of carrying out the invention. This description is made for the purpose of illustration of the general principles of the invention and should not be taken in a limiting sense. The scope of the invention is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
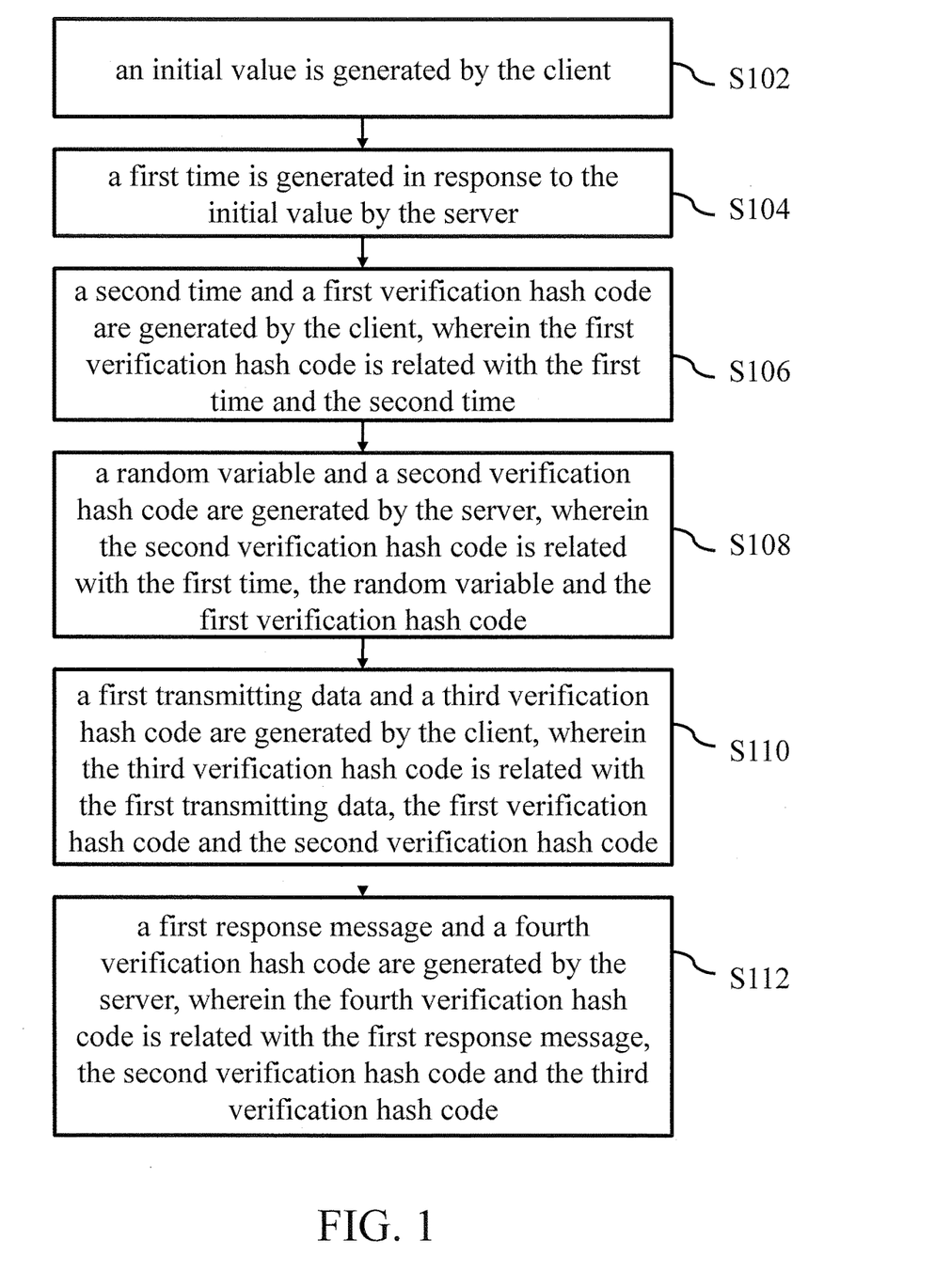
FIG. 1 shows a flowchart of the data transmitting method according to a first exemplary embodiment of the disclosure.
Figure 2:
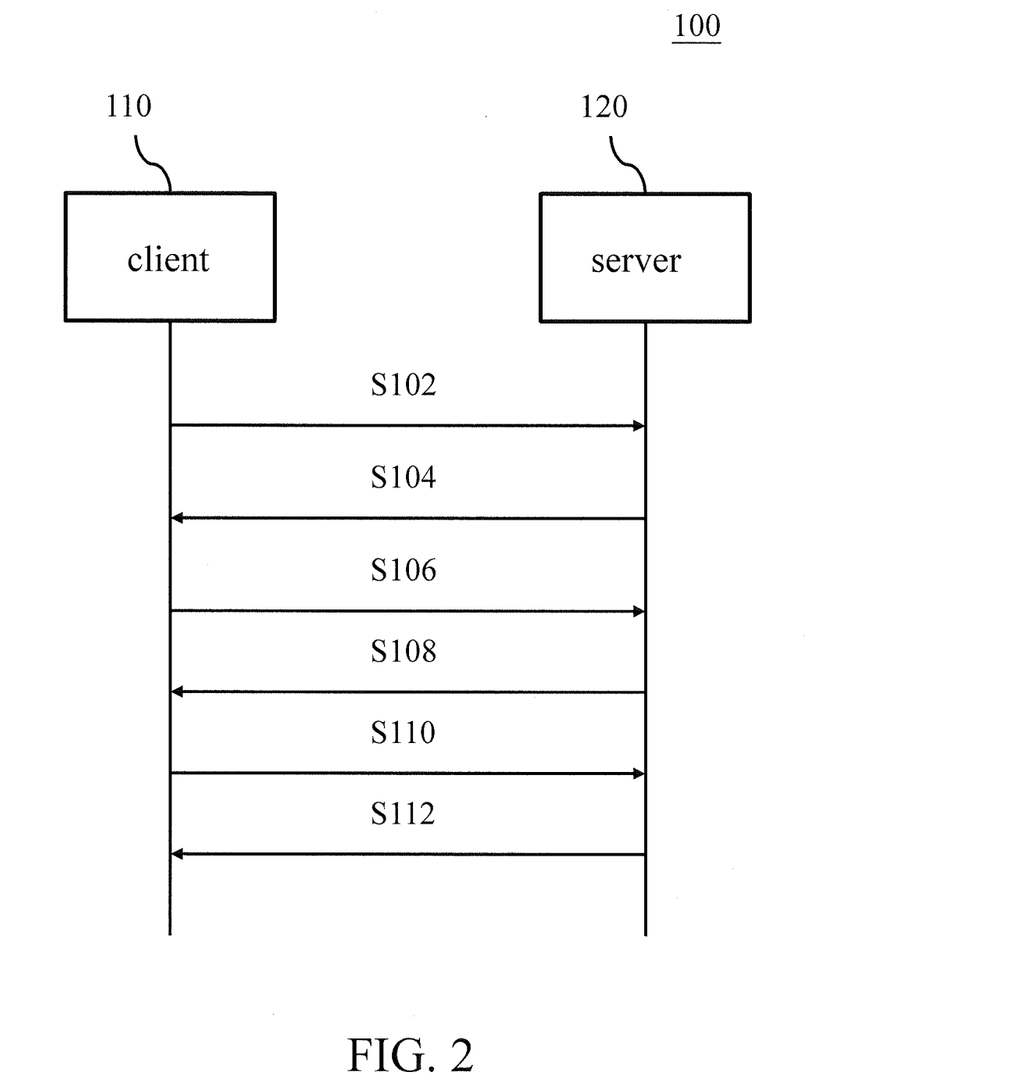
FIG. 2 shows a schematic of the data transmitting between the client and the server in the data transmitting system according to the first exemplary embodiment of the disclosure.

FIG. 1 shows a flowchart of the data transmitting method according to a first exemplary embodiment of the disclosure. FIG. 2 shows a schematic of the data transmitting between the client and the server in the data transmitting system according to the first exemplary embodiment of the disclosure. The data transmitting method of the disclosure is suitable to a client 110 and a server 120 included in a data transmitting system 100. That is, the data transmitting method of the disclosure is used to transmitting data between the client 110 and the server 120. The client 110 may be, for example, a mobile phone, a tablet computer, a desktop computer, a portable computer and so on, or any hardware device equipped with network function, such as IP cam, smart appliance or wearable device. The server 120 may be, for example, an entity or a virtual device of a common server machine or a cloud server and so on.

In the step S102, an initial value is generated by the client 110. That is, the client 110 transmits the initial value to the server 120 served as a basis for the client 110 starting to transmits data to the server 120.

In the step S104, a first time $T_S$ is generated in response to the initial value by the server 120. That is, when the server 120 receives the initial value transmitted from the client 110, the server 120 extracts a time of the server served as the first time $T_S$, and outputs the first time $T_S$ to the client 110.

In the step S106, a second time $T_C$ and a first verification hash code $VH_1(\ )$ are generated by the client 110, wherein the first verification hash code $VH_1(\ )$ is related with the first time $T_S$ and the second time $T_C$. That is, when the client 110 receives the first time $T_S$ transmitted from the server 120, the client 110 extracts a current time of the client 110 served as the second time $T_C$ and generates the first verification hash code $VH_1(\ )$ and then outputs the second time $T_C$ and the first verification hash code $VH_1(\ )$. In the embodiment, the first verification hash code $VH_1(\ )$ may be, for example, a result calculated by the hash function. The first verification hash code $VH_1(\ )$ may include, for example, a shared key K, the first time $T_S$ and the second time $T_C$, i.e. the first verification hash code $VH_1(\ )$ is $VH_1(K+T_S+T_C)$. The second time $T_C$ and the first verification hash code $VH_1(\ )$ may be expressed as $T_C+VH_1(K+T_S+T_C)$.

In the step S108, a random variable Rand and a second verification hash code $VH_2(\ )$ are generated by the server 120, wherein the second verification hash code $VH_2(\ )$ is related with the first time $T_S$, the random variable Rand and the first verification hash code $VH_1(\ )$. That is, when the server 120 receives the second time $T_C$ and the first verification hash code $VH_1(\ )$ transmitted from the client 110, the server 120 generates the random variable Rand and the second verification hash code $VH_2(\ )$ accordingly, and outputs the random variable Rand and the second verification hash code $VH_2(\ )$. In the embodiment, the random variable Rand may be, for example, a 64 bits variable or a parameter automatically generated by system using the random number. The second verification hash code $VH_2(\ )$ may be, for example, a result calculated by the hash function. The second verification hash code $VH_2(\ )$ may include, for example, a shared key K, the first time $T_S$, the random variable Rand and the first verification hash code $VH_1(\ )$ i.e. the second verification hash code $VH_2(\ )$ is $VH_2(K+T_S+Rand+VH_1(\ ))$. The random variable Rand and the second verification hash code $VH_2(\ )$ may be expressed as $Rand+VH_2(K+T_S+Rand+VH_1(\ ))$.

In the step S110, a first transmitting data $V_1$ and a third verification hash code $VH_3(\ )$ are generated by the client 110, wherein the third verification hash code $VH_3(\ )$ is related with the first transmitting data $V_1$, the first verification hash code $VH_1(\ )$ and the second verification hash code $VH_2(\ )$. That is, when the client 110 receives the random variable Rand and the second verification hash code $VH_2(\ )$ transmitted from the server 120, the client 110 generates the first transmitting data $V_1$ and the third verification hash code $VH_3(\ )$ accordingly, and outputs the first transmitting data $V_1$ and the third verification hash code $VH_3(\ )$. In the embodiment, the first transmitting data $V_1$ is data must be transmitted from the client 110 to the server 120. The third verification hash code $VH_3(\ )$ may be, for example, a result calculated by the hash function. The third verification hash code $VH_3(\ )$ may include, for example, a shared key K, a first hash function $h_1(\ )$ and the first transmitting data $V_1$, the first hash function $h_1(\ )$ may include, for example, the first verification hash code $VH_1(\ )$ and the second verification hash code $VH_2(\ )$, i.e. the third verification hash code $VH_3(\ )$ is $VH_3(K+h_1(VH_1(\ )|VH_2(\ )+V_1)$. The first transmitting data $V_1$ and the third verification hash code $VH_3(\ )$ may be expressed as $V_1+VH_3(K+h_1(VH_1(\ )|VH_2(\ ))+V_1)$.

In the step S112, a first response message $R_1$ and a fourth verification hash code $VH_4(\ )$ are generated by the server 120, wherein the fourth verification hash code $VH_4(\ )$ is related with the first response message $R_1$, the second verification hash code $VH_2(\ )$ and the third verification hash code $VH_3(\ )$. That is, when the server 120 receives the first transmitting data $V_1$ and the third verification hash code $VH_3(\ )$ transmitted from the client 110, the server 120 generates the first response message $R_1$ and the fourth verification hash code $VH_4(\ )$ accordingly, and outputs the first response message $R_1$ and the fourth verification hash code $VH_4(\ )$. In the embodiment, the first response message $R_1$ is a message generated by the server 120 in response to receive the data from the client 110. The fourth verification hash code $VH_4(\ )$ may be, for example, a result calculated by the hash function. The fourth verification hash code $VH_4(\ )$ may include, for example, a shared key K, a second hash function $h_2(\ )$ and the first response message $R_1$, the second hash function $h_2(\ )$ may include, for example, the second verification hash code $VH_2(\ )$ and the third verification hash code $VH_3(\ )$ i.e. the fourth verification hash code $VH_4(\ )$ is $VH_4(K+h_2(VH_2(\ )|VH_3(\ ))+R_1)$. The first response message $R_1$ and the fourth verification hash code $VH_4(\ )$ may be expressed as $R_1+VH_3(K+h_2(VH_2(\ )|VH_3(\ ))+R_1)$.

According to the above-mentioned description, when the data are transmitted between the client 110 and the server 120, it requires the preceding message (such as the time or corresponding verification hash code) received from the client 110 or server 120, and encrypts this message and the desired transmitting data to a hash code served as the currently desired transmitting data. Therefore, the connect verifications are independent, the copying package and the repeating attack may be avoided, the message is not resent before the response is received, so as to increase the accuracy for transmitting data.

Figure 3:
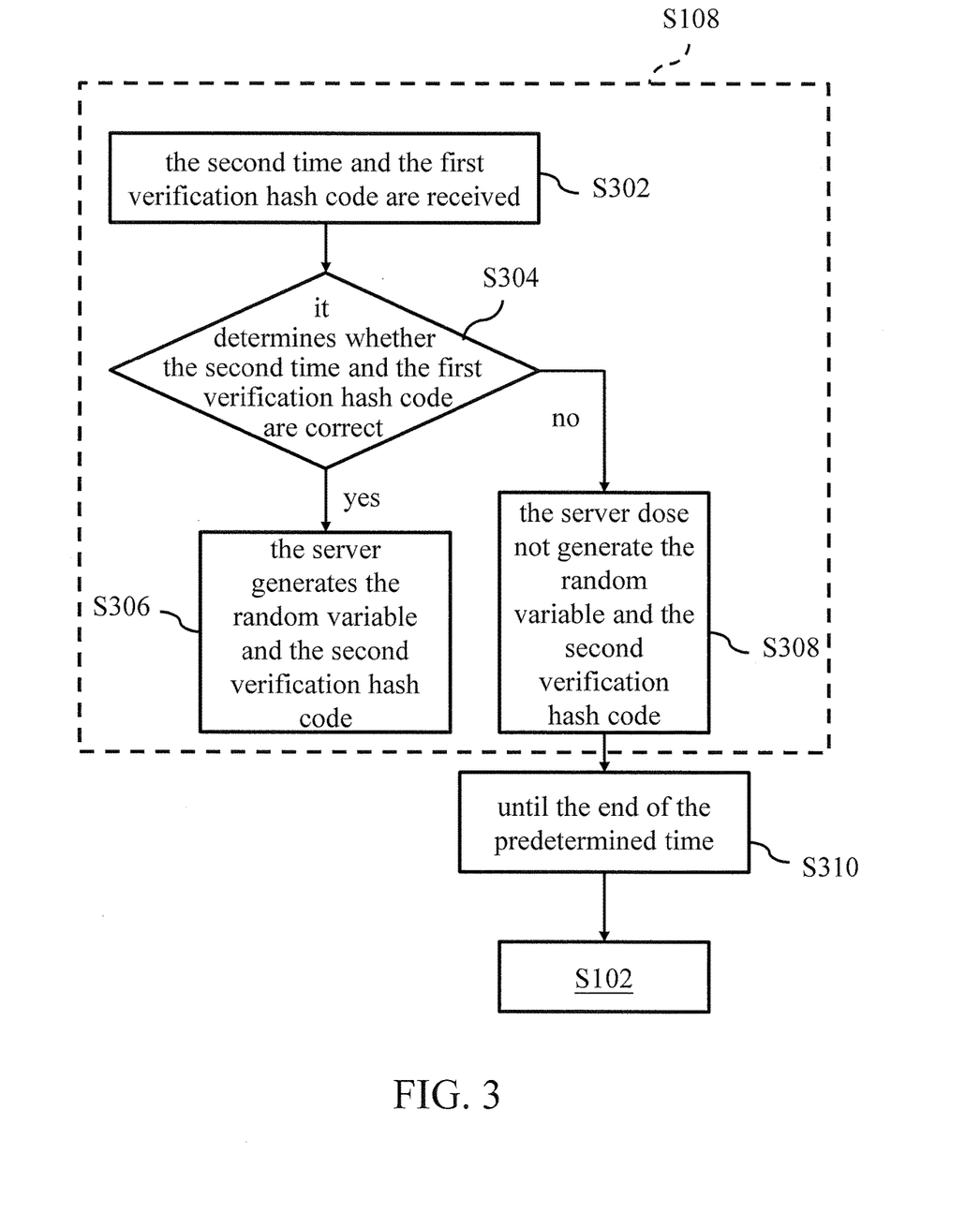
FIG. 3 shows a detailed flowchart of the step S108 in FIG. 1.

FIG. 3 shows a detailed flowchart of the step S108 in FIG. 1. In the step S302, the second time and the first verification hash code are received. In the step S304, it determines whether the second time and the first verification hash code are correct. That is, the server 120 may analyze the second time and the first verification hash code. For example, the server 120 may decode the second time and the first verification hash code according to the predetermined algorithm to determine whether the second time and the first verification hash code are decoded by using the predetermined algorithm, so as to determine the accuracy of the second time and the first verification hash code.

When the second time and the first verification hash code are correct, it means that the server 120 receives the correct message, and the process goes to the step S306, the server 120 generates the random variable and the second verification hash code. When the second time and the first verification hash code are not correct, it means that the server 120 receives the wrong message, then the process goes to the step S308, the server 120 dose not generate the random variable and the second verification hash code. Then, the client 110 dose not receive the response transmitted from the server 120 until the end of the predetermined time (the step S310), the process returns to the step S102, the client 110 generates the initial value again and the process of the data transmitting method of this embodiment is also performed again.

Figure 4:
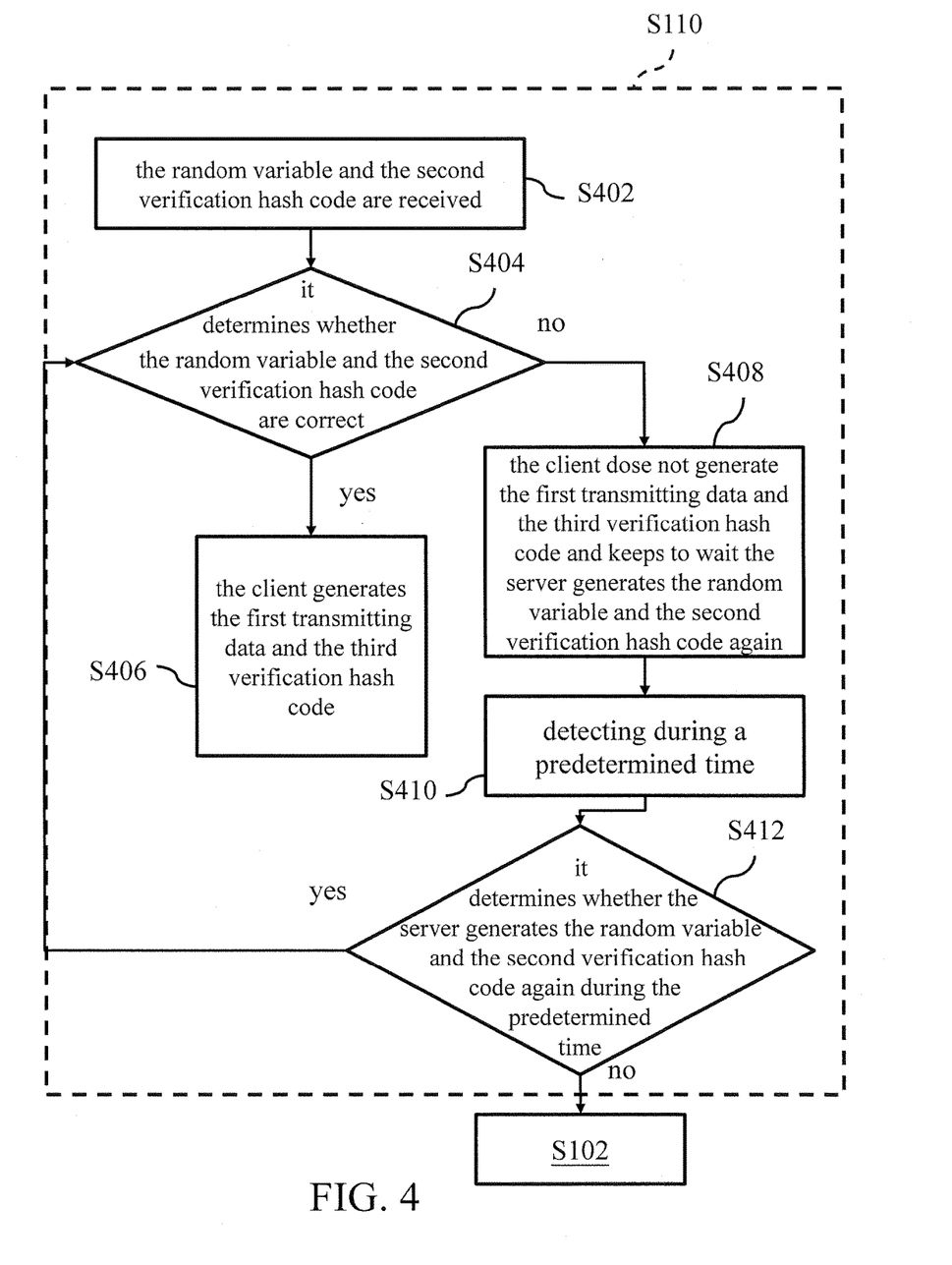
FIG. 4 shows a detailed flowchart of the step S110 in FIG. 1.

FIG. 4 shows a detailed flowchart of the step S110 in FIG. 1. In the step S402, the random variable and the second verification hash code are received. In the step S404, it determines whether the random variable and the second verification hash code are correct. That is, the client 110 may analyze the random variable Rand and the second verification hash code $VH_2(\ )$ transmitted from the server 120, for example, the client 110 may decode the random variable and the second verification hash code according to the predetermined algorithm to determine whether the random variable and the second verification hash code are decoded by using the predetermined algorithm, so as to determine the accuracy of the random variable and the second verification hash code.

When the random variable and the second verification hash code are correct, it means that the client 110 receives the correct message, and the process goes to the step S406, the client 110 generates the first transmitting data and the third verification hash code. When the random variable Rand and the second verification hash code $VH_2(\ )$ are not correct, it means that the client 110 receives the wrong message, and the process goes to the step S408, the client 110 dose not generate the first transmitting data and the third verification hash code and keeps to wait the server 120 generates the random variable and the second verification hash code again.

Then, the client 110 continues to wait to the server 120 generates the random variable and the second verification hash code again during a predetermined time (the step S410), and in the step S412, the client 110 continues to determine whether the server 120 generates the random variable and the second verification hash code again during the predetermined time. When the server 120 generates the random variable and the second verification hash code again, and the process goes to the step S404, the client 110 determines whether the random variable and the second verification hash code are correct again. When the server 120 does not generate the random variable and the second verification hash code again during the predetermined time, the process goes to the step S102, such that the client 110 generates the initial value again and the process of the data transmitting method of this embodiment is also performed again.

Figure 5:
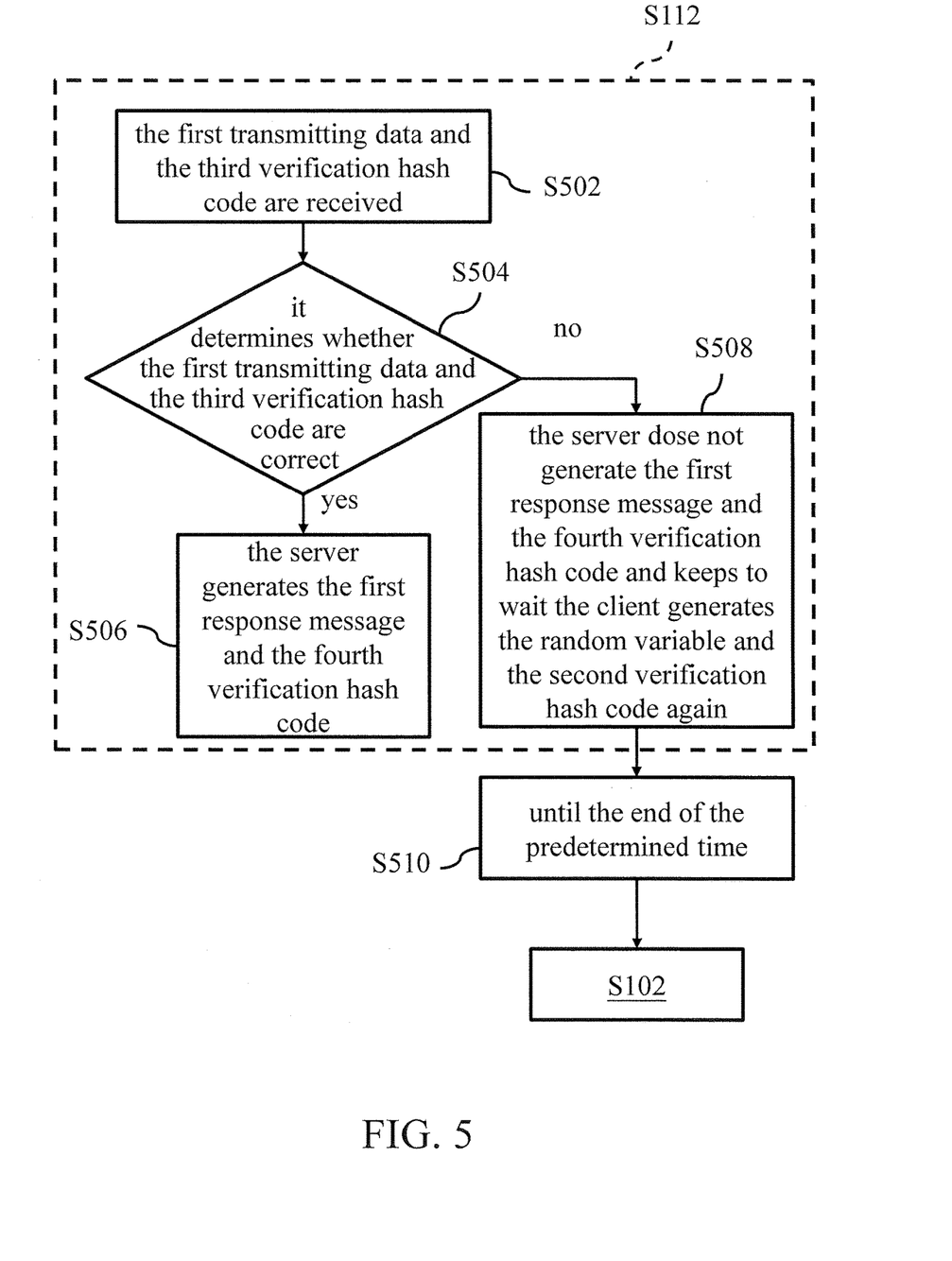
FIG. 5 shows a detailed flowchart of the step S112 in FIG. 1.

FIG. 5 shows a detailed flowchart of the step S112 in FIG. 1. In the step S502, the first transmitting data and the third verification hash code are received. In the step S504, it determines whether the first transmitting data and the third verification hash code are correct. That is, the server 120 may analyze the first transmitting data $V_1$ and the third verification hash code $VH_3(\ )$. For example, the server 120 may decode the first transmitting data and the third verification hash code according to the predetermined algorithm to determine whether the first transmitting data and the third verification hash code are decoded by using the predetermined algorithm, so as to determine the accuracy of the first transmitting data and the third verification hash code.

When the first transmitting data and the third verification hash code are correct, it means that the server 120 receives the correct message, and the process goes to the step S506, the server 120 generates the first response message $R_1$ and the fourth verification hash code $VH_4(\ )$. When the first transmitting data and the third verification hash code are not correct, it means that the server 120 receives the wrong message, and the process goes to the step S508, the server 120 dose not generate the first response message and the fourth verification hash code and keeps to wait the client 110 generates the random variable and the second verification hash code again. Then, the client 110 dose not receive the response transmitted from the server 120 until the end of the predetermined time (the step S510), the process returns to the step S102, the client 110 generates the initial value again and the process of the data transmitting method of this embodiment is also performed again.

Figure 6:
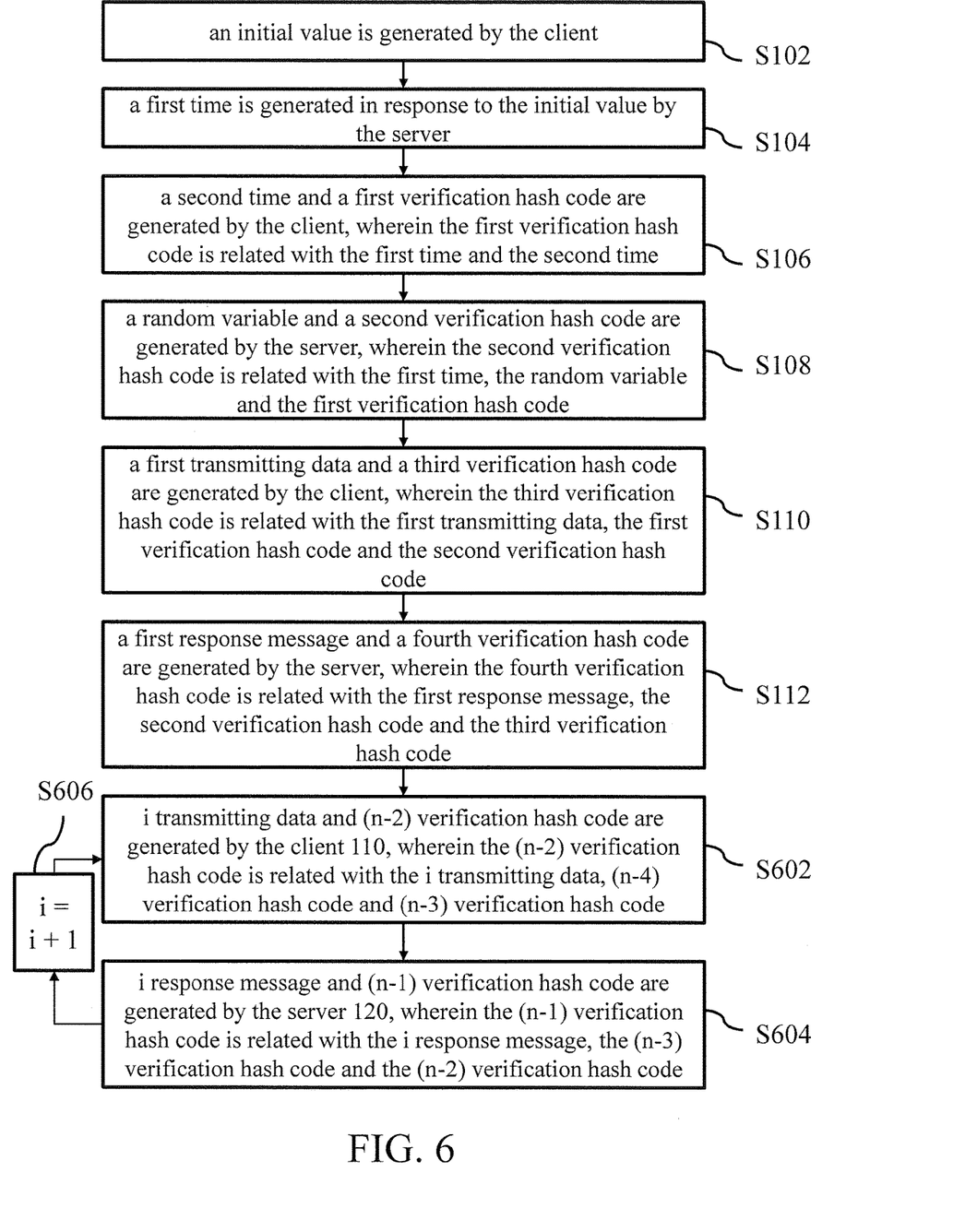
FIG. 6 shows a flowchart of the data transmitting method according to a second exemplary embodiment of the disclosure.
Figure 7:
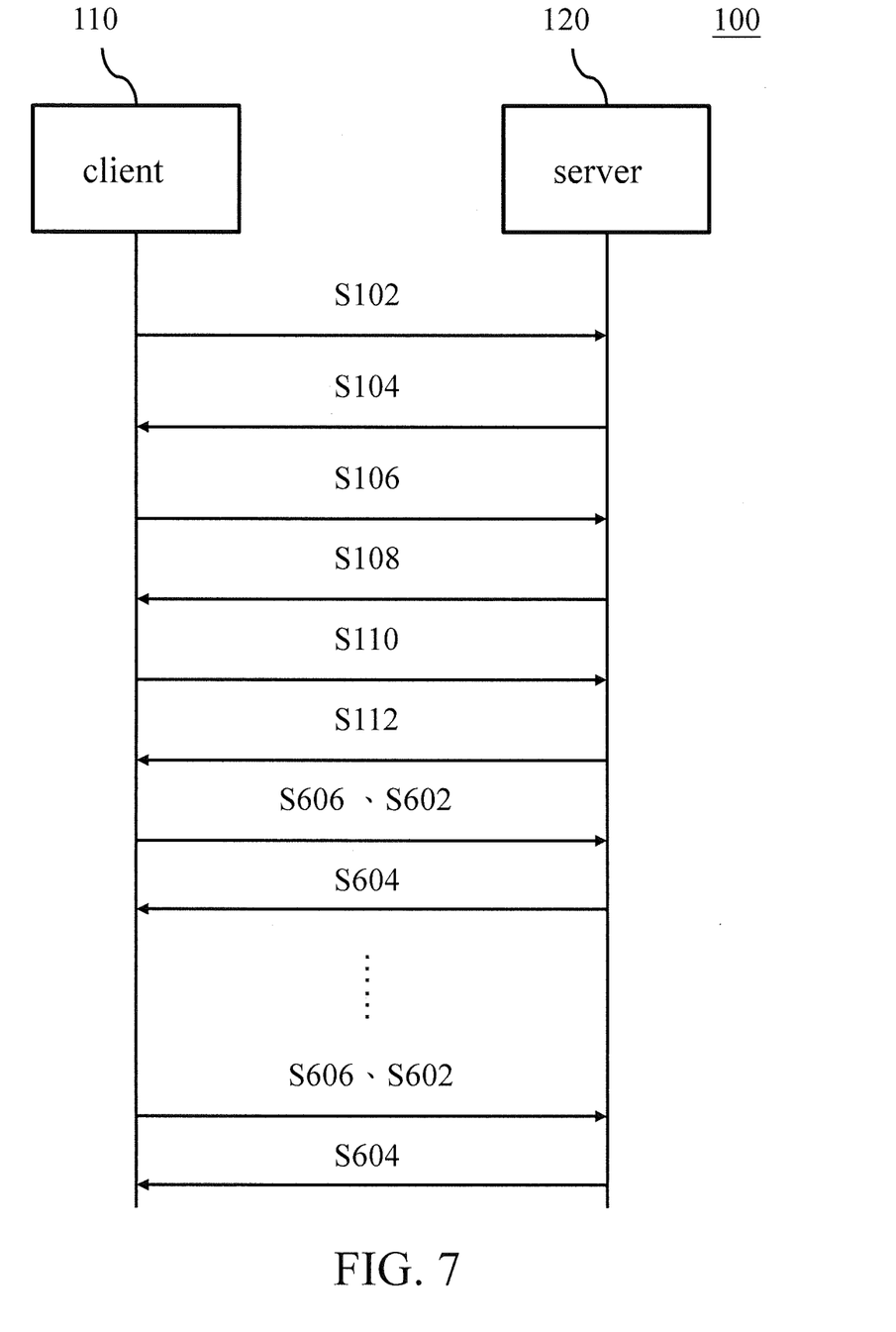
FIG. 7 shows a schematic of the data transmitting between the client and the server in the data transmitting system according to the second exemplary embodiment of the disclosure.

FIG. 6 shows a flowchart of the data transmitting method according to a second exemplary embodiment of the disclosure. FIG. 7 shows a schematic of the data transmitting between the client and the server in the data transmitting system according to the second exemplary embodiment of the disclosure. The data transmitting method of the disclosure is suitable to a client 110 and a server 120 included in a data transmitting system 100. That is, The data transmitting method of the disclosure is used to transmitting data between the client 110 and the server 120. The client 110 may be, for example, a mobile phone, a tablet computer a desktop computer, a portable computer and so on, or any hardware device equipped with network function, such as IP cam, smart appliance or wearable device. The server 120 may be, for example, an entity or a virtual device of a common server machine or a cloud server and so on. In the embodiment, the description of the steps S102, S104, S106, S108, S110 and S112 may be found in the description of the embodiment in FIG. 1. Thus, the description is omitted. The embodiment in FIG. 6 further includes the steps S602 and S604, which is different from the embodiment in FIG. 1.

In the step S602, i transmitting data and (n-2) verification hash code are generated by the client 110, wherein the (n-2) verification hash code is related with the i transmitting data, (n-4) verification hash code and (n-3) verification hash code, i is a positive integer greater than 1, n=2i+3.

In the step S604, i response message and (n-1) verification hash code are generated by the server 120, wherein the (n-1) verification hash code is related with the i response message, the (n-3) verification hash code and the (n-2) verification hash code.

After the step S604 is completed, the process may go to the step S606, i=i+1, and the process then returns to the step S602 and repeats the steps S602 and S604, so as to continue the operation of the data transmitting and verification.

Further, the i transmitting data and the (n-2) verification hash code are generated by the client 110 satisfies the following formula 1:

$$V_i + VH_{n-2}(K + h_{n-4}(VH_{n-4}()|VH_{n-3}()) + V_i); \quad \text{(formula 1)}$$

wherein, $V_i$ is the i transmitting data, $VH_{n-2}()$ is the (n-2) verification hash code, $VH_{n-4}()$ is the (n-4) verification hash code, $VH_{n-3}()$ is the (n-3) verification hash code, $h_{n-4}()$ is (n-4) hash function, K is a shared key.

The the i response message and the (n-1) verification hash code are generated by the server 120 satisfies the following formula 2:

$$R_i + VH_{n-1}(K + h_{n-3}()|VH_{n-3}()|VH_{n-2}()) + R_i); \quad \text{(formula 2)}$$

wherein, $R_i$ is the i response message, $VH_{n-1}()$ is the (n-1) verification hash code, $VH_{n-3}()$ is the (n-3) verification hash code, $VH_{n-2}()$ is the (n-2) verification hash code, $h_{n-3}()$ is (n-3) hash function, K is the shared key.

For example, when the client 110 receives the first response message and the fourth verification hash code transmitted from the server 120 (the step S112), the client 110 may generate a second transmitting data (i=2) and a fifth verification hash code (n=2i+3=7) (the step S602) accordingly, and then outputs the second transmitting data $V_2$ and the fifth verification hash code $VH_5()$. The second transmitting data $V_2$ and the fifth verification hash code $VH_5()$ may be expressed as $V_2 + VH_5(K + h_3(VH_3()|VH_4()) + V_2)$, wherein $V_2$ is the second transmitting data, $VH_5()$ is the fifth verification hash code, $VH_3()$ is the third verification hash code, $VH_4()$ is the fourth verification hash code, $h_3()$ is a third hash function which is a result calculated by the hash function, K is the shared key.

Then, when the server 120 receives the second transmitting data and the fifth verification hash code $VH_5$ transmitted from the client 110 (the step S602), the server 120 may generate a second response message (i=2) and a sixth verification hash code accordingly, and then outputs the second response message and the sixth verification hash code (the step S602). The second response message $R_2$ and the sixth verification hash code $VH_6()$ may expressed as $R_2 + VH_6(K + h_4(VH_4()|VH_5()) + R_2)$, wherein $R_2$ is the second response message, $VH_6$ is the sixth verification hash code, $VH_4()$ is the fourth verification hash code, $VH_5()$ is the fifth verification hash code, $h_4()$ is a fourth hash function which is a result calculated by the hash function, K is the shared key.

After the step S604 is completed, the process may go to the step S606 of i=i+1, and then the process returns to the step S602 (i.e. i=3, n=9), so as to continue to transmit the data between the client 110 and the server 120. That is, when the client 110 receives the second response message $R_2$ and the sixth verification hash code $VH_6()$ transmitted from the server 120 (the step S604), the client 110 may generate a third transmitting data (i.e. i=3) and a seventh verification hash code (n=2i+3=9) (the step S602) accordingly, and then outputs the third transmitting data and the seventh verification hash code. The third transmitting data $V_3$ and the seventh verification hash code $VH_7()$ may expressed as $V_3 + VH_7(K + h_5(VH_5()|VH_6()) + V_3)$, wherein $V_3$ is the third transmitting data, $VH_7()$ is the seventh verification hash code, $VH_5()$ is the fifth verification hash code, $VH_6()$ is the sixth verification hash code, $h_5()$ is a fifth hash function which is a result calculated by the hash function, K is the shared key.

Then, when the server 120 receives the third transmitting data and the seventh verification hash code transmitted from the client 110 (the step S602), the server 120 may generate a third response message (i=3) and an eighth verification hash code (n=9) (the step S604) accordingly, and then outputs the third response message $R_3$ and the eighth verification hash code $VH_8()$. The third response message and the eighth verification hash code may expressed as $R_3 + VH_8(K + h_6(VH_6()|VH_7()) + R_3)$, wherein $R_3$ is the third response message, $VH_8()$ is the eighth verification hash code, $VH_6()$ is the sixth verification hash code, $VH_7()$ is the seventh verification hash code, $h_6()$ is a sixth hash function which is a result calculated by the hash function, K is the shared key. The remainder data transmitting manner (i.e. i=4, 5, 6, . . . ) between the client 110 and the server 120 may refer to the above-mentioned description, and the description is omitted.

Figure 8:
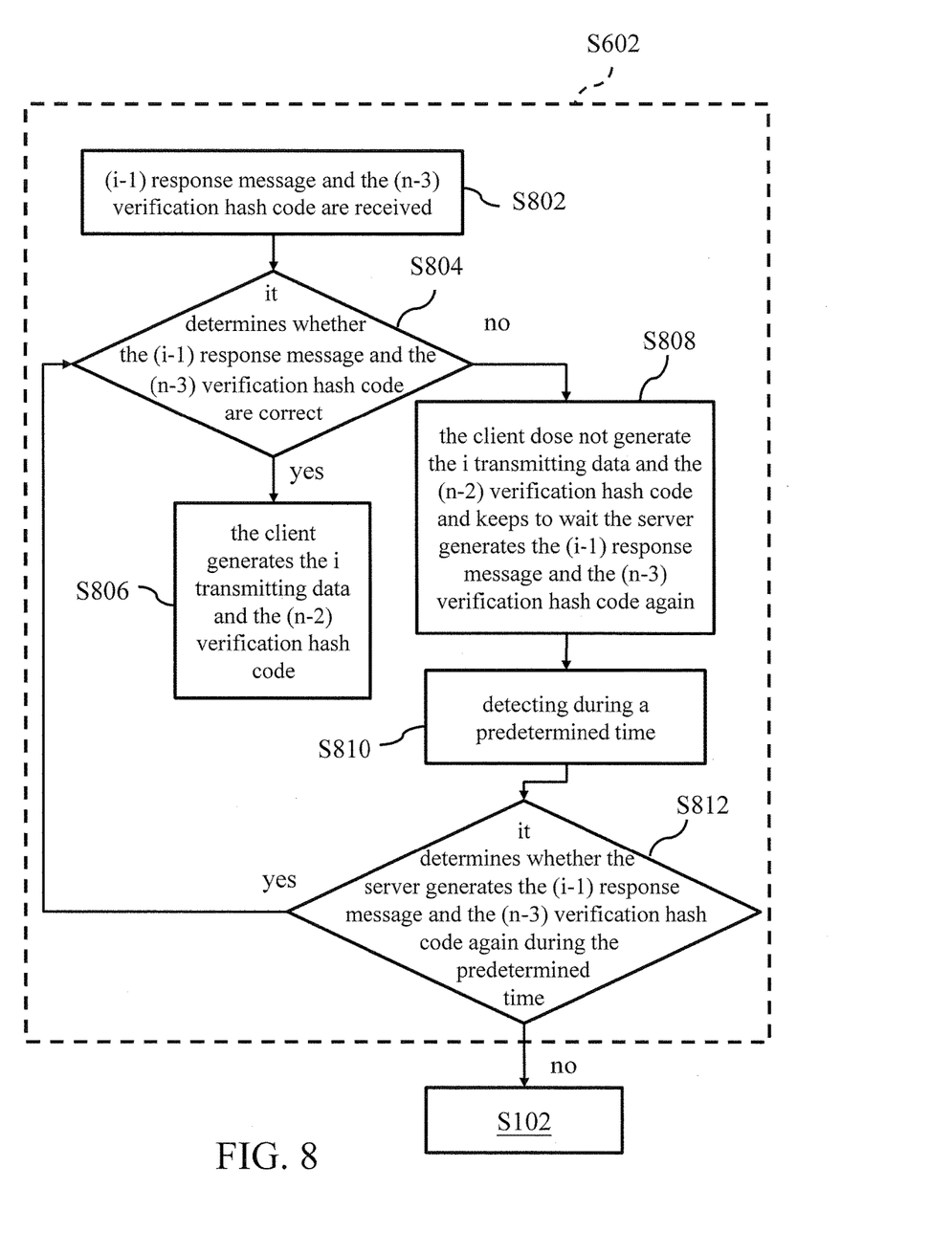
FIG. 8 shows a detailed flowchart of the step S602 in FIG. 6.

FIG. 8 shows a detailed flowchart of the step S602 in FIG. 6. In the step S802, (i-1) response message and the (n-3) verification hash code are received. In the step S804, it is determined whether the (i-1) response message and the (n-3) verification hash code are correct. That is, the client 110 may analyze the (i-1) response message and the (n-3) verification hash code. For example, the client 110 may decode the (i-1) response message and the (n-3) verification hash code according to the predetermined algorithm to determine whether the (i-1) response message and the (n-3) verification hash code are decoded by using the predetermined algorithm, so as to determine the accuracy of the (i-1) response message and the (n-3) verification hash code.

When the (i-1) response message and the (n-3) verification hash code are correct, it means that the client 110 receives the correct message, and the process goes to the step S806, the client 110 generates the i transmitting data and the (n-2) verification hash code. When the (i-1) response message and the (n-3) verification hash code are not correct, it means that the client 110 receives the wrong message, and the process goes to the step S808, the client 110 dose not generate the i transmitting data and the (n-2) verification hash code and keeps to wait the server 120 generates the (i-1) response message and the (n-3) verification hash code again.

Then, the client 110 continues to wait to the server 120 generates the (i-1) response message and the (n-3) verification hash code again during a predetermined time (the step S810), and in the step S812, the client 110 continues to determine whether the server 120 generates the (i-1) response message and the (n-3) verification hash code again during the predetermined time. When the server 120 generates the (i-1) response message and the (n-3) verification hash code again, and the process goes to the step 804, the client 110 determines whether the server 120 generates the (i-1) response message and the (n-3) verification hash code again. When the server 120 does not generate the (i-1) response message and the (n-3) verification hash code again during the predetermined time, the process goes to the step S102, the client 110 generates the initial value again and the process of the data transmitting method of this embodiment is also performed again.

Figure 9:
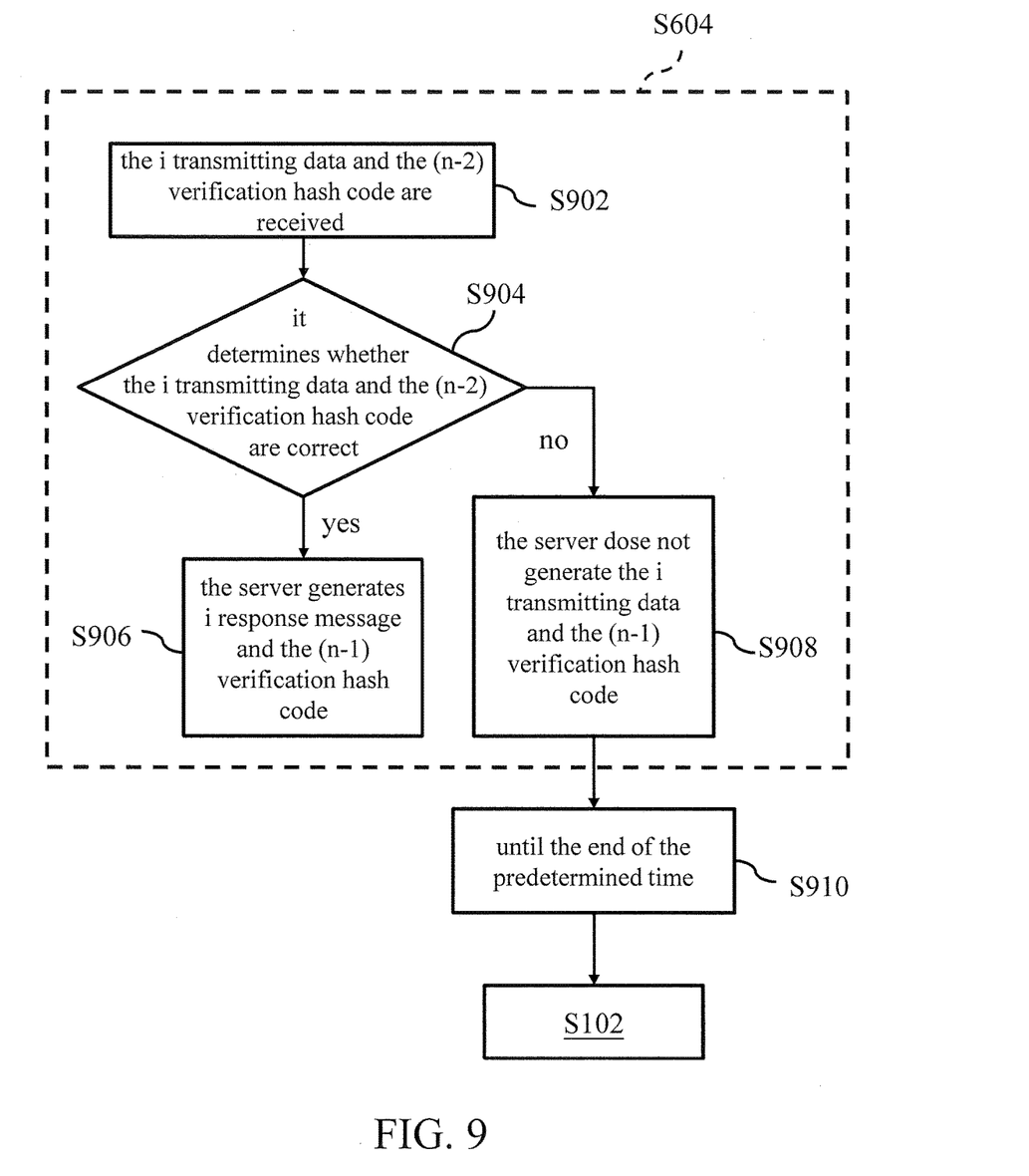
FIG. 9 shows a detailed flowchart of the step S604 in FIG. 6.

FIG. 9 shows a detailed flowchart of the step S604 in FIG. 6. In the step S902, the i transmitting data and the (n-2) verification hash code are received. In the step S904, it is determined whether the i transmitting data and the (n-2) verification hash code are correct. That is, the server 120 may analyze the i transmitting data and the (n-2) verification hash code, for example, the server 120 may decode the i transmitting data and the (n-2) verification hash code according to the predetermined algorithm to determine whether the i transmitting data and the (n-2) verification hash code are decoded by using the predetermined algorithm, so as to determine the accuracy of the i transmitting data and the (n-2) verification hash code.

When the i transmitting data and the (n-2) verification hash code are correct, it means that the server 120 receives the correct message, and the process goes to the step S906, the server 120 generates i response message and the (n-1) verification hash code. When the i transmitting data and the (n-2) verification hash code are not correct, it means that the server 120 receives the wrong message, and the process goes to the step S908, the server 120 dose not generate the i transmitting data and the (n-1) verification hash code. Then, the client 110 dose not receive the response transmitted from the server 120 until the end of the predetermined time (the step S910), the process returns to the step S102, the client 110 generates the initial value again and the process of the data transmitting method of this embodiment is also performed again.

According to the above-mentioned description, when the data are transmitted between the client 110 and the server 120, it should be needed the preceding message (such as the time or corresponding verification hash code) received from the client 110 or server 120, and encrypts this message and the desired transmitting data to a hash code served as the currently desired transmitting data. Therefore, the connect verifications are independent, the copying package and the repeating attack may be avoided, and the message is not resent before the response is received, so as to increase the accuracy for transmitting data.

Figure 10:
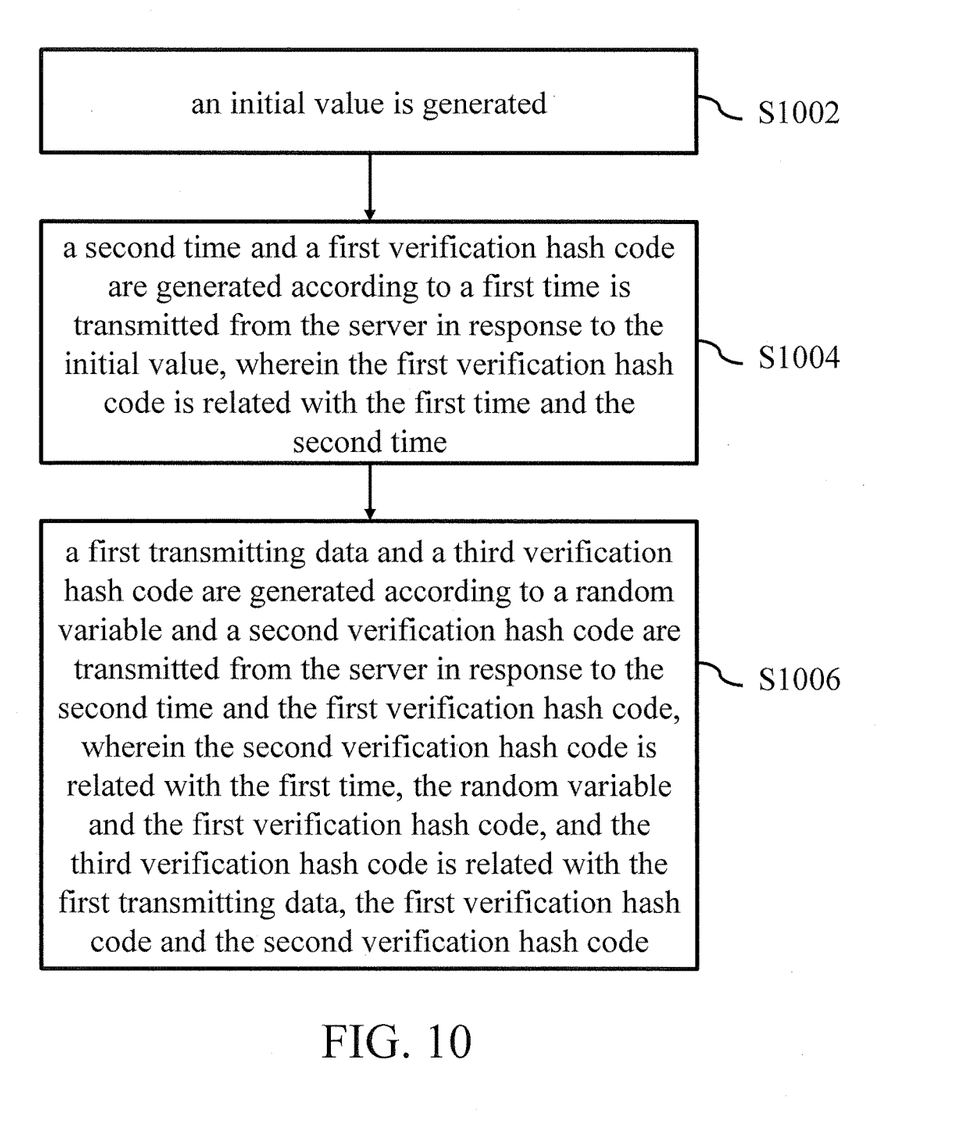
FIG. 10 shows a flowchart of the data transmitting method for the client according to a third exemplary embodiment of the disclosure.

FIG. 10 shows a flowchart of the data transmitting method for the client according to a third exemplary embodiment of the disclosure. The data transmitting method for the client of the disclosure is suitable to transmit and receive data to and from a server. The corresponding relationship between the client and the server may refer to FIG. 2, and the description is omitted.

In the step 1002, an initial value is generated. In the step 1004, a second time $T_C$ and a first verification hash code $VH_1(\ )$ are generated according to a first time $T_S$ is transmitted from the server in response to the initial value, wherein the first verification hash code $VH_1(\ )$ is related with the first time $T_S$ and the second time $T_C$.

In the step 1006, a first transmitting data $V_1$ and a third verification hash code $VH_3(\ )$ are generated according to a random variable Rand and a second verification hash code $VH_2(\ )$ are transmitted from the server in response to the second time $T_C$ and the first verification hash code $VH_1(\ )$ wherein the second verification hash code $VH_2(\ )$ is related with the first time $T_S$, the random variable Rand and the first verification hash code $VH_1(\ )$ and the third verification hash code $VH_3(\ )$ is related with the first transmitting data, the first verification hash code $VH_1(\ )$ and the second verification hash code $VH_2(\ )$. The related operation of this embodiment may refer to the embodiments in FIGS. 1 to 5, and the description is omitted.

Figure 11:
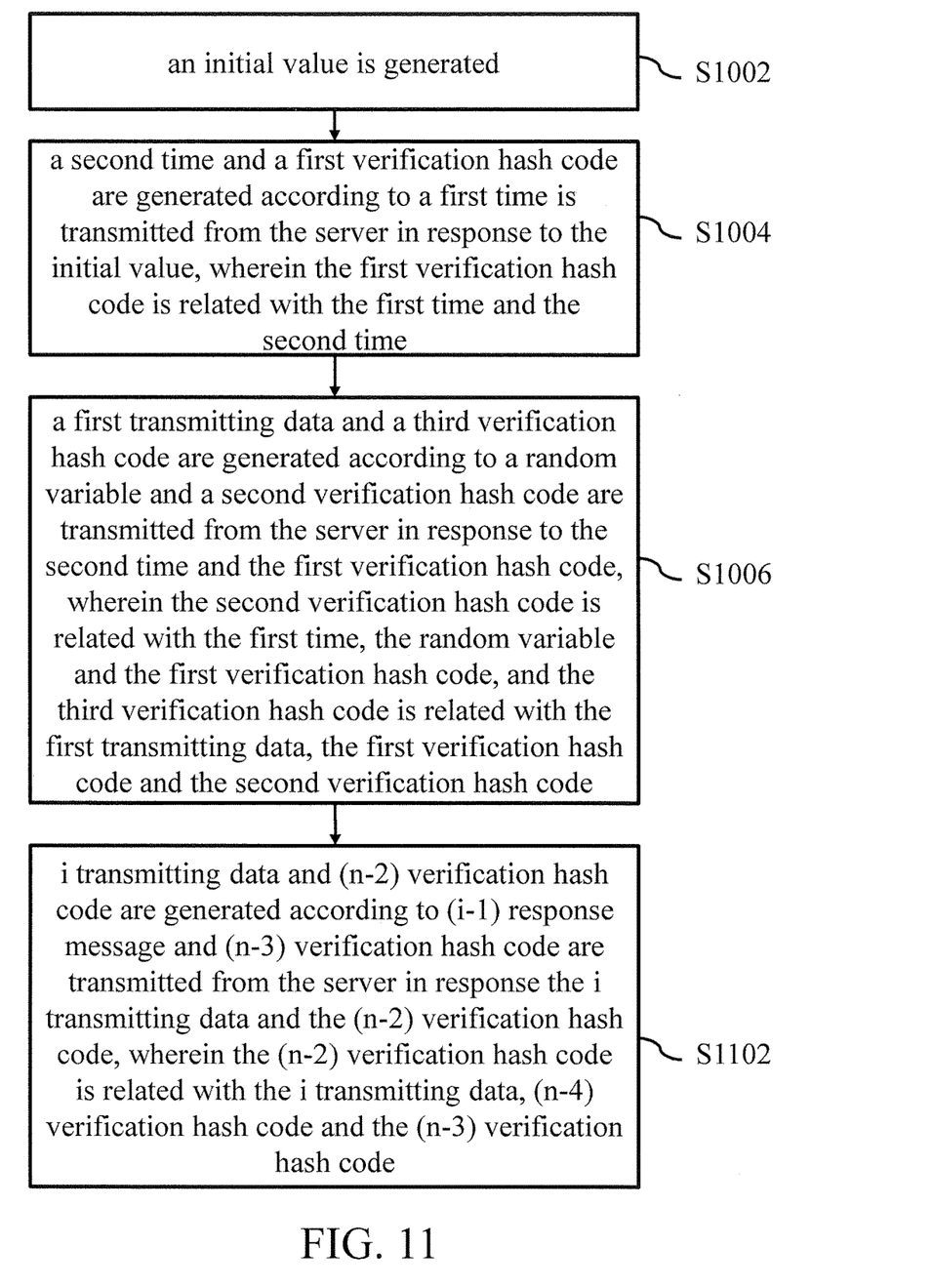
FIG. 11 shows a flowchart of the data transmitting method for the client according to a fourth exemplary embodiment of the disclosure.

FIG. 11 shows a flowchart of the data transmitting method for the client according to a fourth exemplary embodiment of the disclosure. In the embodiment, the description of the steps S1002, S1004 and S1006 can be found in the description of the embodiment in FIG. 10. Thus, the description is omitted. The embodiment in FIG. 11 further includes the step S1102, which is different from the embodiment in FIG. 10.

In the step 1102, i transmitting data and (n-2) verification hash code are generated according to (i-1) response message and (n-3) verification hash code are transmitted from the server in response the i transmitting data and the (n-2) verification hash code, wherein the (n-2) verification hash code is related with the i transmitting data, (n-4) verification hash code and the (n-3) verification hash code, i is a positive integer greater than 1, n=2i+3. The related operation of this embodiment may refer to the embodiments in FIGS. 6 to 9, and the description is omitted.

According to the data transmitting method and system and the data transmitting method for the client of the above-mentioned embodiments, after receiving the message (such as the first time or verification hash code) transmitted from the server, the client generates the corresponding message (such as the transmitting data or the corresponding verification hash code) accordingly and after receiving the message (such as the second time, the verification hash code or the transmitting data) transmitted from the client, the server generates the corresponding message (such as the response message or the corresponding verification hash code) accordingly. Therefore, the connect verifications are independent, the copying package and the repeating attack may be avoided, and the message is not resent before the response is received, so as to increase the accuracy for transmitting data.

Although the disclosure has been explained in relation to its preferred embodiment, it does not intend to limit the disclosure. It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A data transmitting method, suitable to a client and a server, comprising:
   generating an initial value by the client;
   generating a first time by the server in response to the initial value;
   generating a second time and a first verification hash code by the client, wherein the first verification hash code is related with the first time and the second time;
   generating a random variable and a second verification hash code by the server, wherein the second verification hash code is related with the first time, the random variable and the first verification hash code;
   generating a first transmitting data and a third verification hash code by the client, wherein the third verification hash code is related with the first transmitting data, the first verification hash code and the second verification hash code; and
   generating a first response message and a fourth verification hash code by the server, wherein the fourth verification hash code is related with the first response message, the second verification hash code and the third verification hash code.

2. The data transmitting method as claimed in claim 1, wherein the first verification hash code comprises a shared key, the first time and the second time; the second verification hash code comprises the shared key, the first time, the random variable and the first verification hash code; the third verification hash code comprises the shared key, a first hash function and the first transmitting data, the first hash function comprises the first verification hash code and the second verification hash code; the fourth verification hash code comprises the shard key, a second hash function and the first response message, the second hash function comprises the second verification hash code and the third verification hash code.

3. The data transmitting method as claimed in claim 1, further comprising:
   generating i transmitting data and (n-2) verification hash code by the client, wherein the (n-2) verification hash code is related with the i transmitting data, (n-4) verification hash code and (n-3) verification hash code, i is a positive integer greater than 1, n=2i+3;
   generating i response message and (n-1) verification hash code by the server, wherein the (n-1) verification hash code is related with the i response message, the (n-3) verification hash code and the (n-2) verification hash code; and
   repeating the steps of generating the i transmitting data and the (n-2) verification hash code by the client and generating the i response message and the (n-1) verification hash code by the server.

4. The data transmitting method as claimed in claim 3, wherein the step of generating the i transmitting data and the (n-2) verification hash code by the client comprising:
   receiving (i-1) response message and the (n-3) verification hash code;
   determining whether the (i-1) response message and the (n-3) verification hash code are correct;
   when the (i-1) response message and the (n-3) verification hash code are correct, the client generates the i transmitting data and the (n-2) verification hash code;
   when the (i-1) response message and the (n-3) verification hash code are not correct, the client does not generate the i transmitting data and the (n-2) verification hash code and waits for the server to generate the (i-1) response message and the (n-3) verification hash code again;
   determining whether the server generates the (i-1) response message and the (n-3) verification hash code again during a predetermined time;
   when the server generates the (i-1) response message and the (n-3) verification hash code again, returning to the step of determining whether the server generates the (i-1) response message and the (n-3) verification hash code; and
   when the server does not generate the (i-1) response message and the (n-3) verification hash code again, returning to the step of generating the initial value by the client.

5. The data transmitting method as claimed in claim 3, wherein the step of generating the i response message and the (n-1) verification hash code by the server comprising:
   receiving the i transmitting data and the (n-2) verification hash code;
   determining whether the i transmitting data and the (n-2) verification hash code are correct;
   when the i transmitting data and the (n-2) verification hash code are correct, the server generates the i response message and the (n-1) verification hash code; and
   when the i transmitting data and the (n-2) verification hash code are not correct, the server dose not generate the i transmitting data and the (n-1) verification hash code and returns to the step of generating the initial value by the client for a predetermined time.

6. The data transmitting method as claimed in claim 1, wherein the step of generating the random variable and the second verification hash code by the server comprising:
   receiving the second time and the first verification hash code;
   determining whether the second time and the first verification hash code are correct;
   when the second time and the first verification hash code are correct, the server generates the random variable and the second verification hash code; and
   when the second time and the first verification hash code are not correct, the server dose not generate the random variable and the second verification hash code and returns to the step of generating the initial value by the client for a predetermined time.

7. The data transmitting method as claimed in claim 1, wherein the step of generating the first transmitting data and the third verification hash code by the client comprising:
   receiving the random variable and the second verification hash code;
   determining whether the random variable and the second verification hash code are correct;
   when the random variable and the second verification hash code are correct, the client generates the first transmitting data and the third verification hash code;
   when the random variable and the second verification hash code are not correct, the client does not generate the first transmitting data and the third verification hash code and waits for the server to generate the random variable and the second verification hash code again;
   determining whether the server generates the random variable and the second verification hash code again during a predetermined time;
   when the server generates the random variable and the second verification hash code again, returning to the step of determining whether the random variable and the second verification hash code are correct; and when the server does not generate the random variable and the second verification hash code again, returning to the step of generating the initial value by the client.

8. The data transmitting method as claimed in claim 1, wherein the step of generating the first response message and the fourth verification hash code by the server comprising:

receiving the first transmitting data and the third verification hash code;

determining whether the first transmitting data and the third verification hash code are correct;

when the first transmitting data and the third verification hash code are correct, the server generates the first response message and the fourth verification hash code; and when the first transmitting data and the third verification hash code are not correct, the server dose not generate the first response message and the fourth verification hash code and returns to the step of generating the initial value by the client for a predetermined time.

9. A data transmitting system, comprising:
a client, generating an initial value; and
a server, generating a first time in response to the initial value;
wherein, the client generates a second time and a first verification hash code in response to the first time, wherein the first verification hash code is related with the first time and the second time;
wherein, the server generates a random variable and a second verification hash code in response to the second time and the first verification hash code, wherein the second verification hash code is related with the first time, the random variable and the first verification hash code;
wherein, the client generates a first transmitting data and a third verification hash code in response to the random variable and the second verification hash code, wherein the third verification hash code is related with the first transmitting data, the first verification hash code and the second verification hash code; and
wherein, the server generates a first response message and a fourth verification hash code in response to the first transmitting data and the third verification hash code, wherein the fourth verification hash code is related with the first response message, the second verification hash code and the third verification hash code.

10. The data transmitting system as claimed in claim 9, wherein the first verification hash code comprises a shared key, the first time and the second time; the second verification hash code comprises the shared key, the first time, the random variable and the first verification hash code; the third verification hash code comprises the shared key, a first hash function and the first transmitting data, the first hash function comprises the first verification hash code and the second verification hash code; the fourth verification hash code comprises the shard key, a second hash function and the first response message, the second hash function comprises the second verification hash code and the third verification hash code.

11. The data transmitting system as claimed in claim 9, wherein the client further generates i transmitting data and (n-2) verification hash code in response to (i-1) response message and (n-3) verification hash code, wherein the (n-2) verification hash code is related with the i transmitting data, the (n-4) verification hash code and the (n-3) verification hash code, i is a positive integer greater than 1, n=2i+3;

wherein, the server generates i response message and (n-1) verification hash code in response to the i transmitting data and the (n-2) verification hash code, wherein the (n-1) verification hash code is related with the i response message, the (n-3) verification hash code and the (n-2) verification hash code.

12. The data transmitting system as claimed in claim 11, wherein the client further receives the (i-1) response message and the (n-3) verification hash code, and determines whether the (i-1) response message and the (n-3) verification hash code are correct;

when the (i-1) response message and the (n-3) verification hash code are correct, the client generates the i transmitting data and the (n-2) verification hash code;

when the (i-1) response message and the (n-3) verification hash code are not correct, the client does not generate the i transmitting data and the (n-2) verification hash code and waits for the server to generate the (i-1) response message and the (n-3) verification hash code again;

the client determines whether the server generates the (i-1) response message and the (n-3) verification hash code again during a predetermined time;

when the server generates the (i-1) response message and the (n-3) verification hash code again, the client determines whether the server generates the (i-1) response message and the (n-3) verification hash code again until the (i-1) response message and the (n-3) verification hash code are correct and the client generates the i transmitting data and the (n-2) verification hash code; and when the server does not generate the (i-1) response message and the (n-3) verification hash code again, the client generates the initial value again.

13. The data transmitting system as claimed in claim 11, wherein the server receives the i transmitting data and the (n-2) verification hash code and determines whether the i transmitting data and the (n-2) verification hash code are correct;

when the i transmitting data and the (n-2) verification hash code are correct, the server generates the i response message and the (n-1) verification hash code; and when the i transmitting data and the (n-2) verification hash code are not correct, the server dose not generate the i response message and the (n-1) verification hash code and returns to the step of generating the initial value by the client for a predetermined time.

14. The data transmitting system as claimed in claim 9, wherein the server receives the second time and the first verification hash code and determines whether the second time and the first verification hash code are correct;

when the second time and the first verification hash code are correct, the server generates the random variable and the second verification hash code; and when second time and the first verification hash code are not correct, the server dose not generate the random variable and the second verification hash code and returns to the step of generating the initial value by the client for a predetermined time.

15. The data transmitting system as claimed in claim 9, wherein the client receives the random variable and the second verification hash code and determines whether the random variable and the second verification hash code are correct;

when the random variable and the second verification hash code are correct, the client generates the first transmitting data and the third verification hash code;

when the random variable and the second verification hash code are not correct, the client does not generate the first transmitting data and the third verification hash code and waits for the server to generate the random variable and the second verification hash code again;

the client determines whether the server generates the random variable and the second verification hash code again during a predetermined time;

when the server generates the random variable and the second verification hash code again, the client determines whether the random variable and the second verification hash code are correct again until the random variable and the second verification hash code are correct and the client generates the first transmitting data and the third verification hash code; and when the server does not generate the random variable and the second verification hash code again, the client generates the initial value again.

16. The data transmitting system as claimed in claim 9, wherein the server receives the first transmitting data and the third verification hash code and determines whether the first transmitting data and the third verification hash code are correct;

when the first transmitting data and the third verification hash code are correct, the server generates the first response message and the fourth verification hash code; and when the first transmitting data and the third verification hash code are not correct, the server dose not generate the first response message and the fourth verification hash code and returns to the step of generating the initial value by the client for a predetermined time.

17. A data transmitting method for a client, suitable to transmit and receive data to and from a server, the method comprising:
generating an initial value;
generating a second time and a first verification hash code according to a first time is transmitted from the server in response to the initial value, wherein the first verification hash code is related with the first time and the second time; and
generating a first transmitting data and a third verification hash code according to a random variable and a second verification hash code are transmitted from the server in response to the second time and the first verification hash code, wherein the second verification hash code is related with the first time, the random variable and the first verification hash code, and the third verification hash code is related with the first transmitting data, the first verification hash code and the second verification hash code.

18. The data transmitting method for the client as claimed in claim 17, further comprising:
generating i transmitting data and (n-2) verification hash code according to (i-1) response message and (n-3) verification hash code are transmitted from the server in response to the (i-1) transmitting data and the (n-4) verification hash code, wherein the (n-2) verification hash code is related with the i transmitting data, (n-4) verification hash code and the (n-3) verification hash code, i is a positive integer greater than 1, n=2i+3, when i=2, (i-1) transmitting data is the first transmitting data.

19. The data transmitting method for the client as claimed in claim 18, wherein the step of generating the i transmitting data and the (n-2) verification hash code comprising:
receiving the (i-1) response message and the (n-3) verification hash code;
determining whether the (i-1) response message and the (n-3) verification hash code are correct;
when the (i-1) response message and the (n-3) verification hash code are correct, the client generates the i transmitting data and the (n-2) verification hash code;
when the (i-1) response message and the (n-3) verification hash code are not correct, the client does not generate the i transmitting data and the (n-2) verification hash code and waits for the server to generate the (i-1) response message and the (n-3) verification hash code again;
determining whether the server generates the (i-1) response message and the (n-3) verification hash code again during a predetermined time;
when the server generates the (i-1) response message and the (n-3) verification hash code again, returning to the step of determining whether the server generates the (i-1) response message and the (n-3) verification hash code; and
when the server does not generate the (i-1) response message and the (n-3) verification hash code again, returning to the step of generating the initial value by the client.

20. The data transmitting method for the client as claimed in claim 18, wherein the step of generating the first transmitting data and the third verification hash code comprising:
receiving the random variable and the second verification hash code;
determining whether the random variable and the second verification hash code are correct;
when the random variable and the second verification hash code are correct, the client generates the first transmitting data and the third verification hash code;
when the random variable and the second verification hash code are not correct, the client does not generate the first transmitting data and the third verification hash code and waits for the server to generate the random variable and the second verification hash code again;
determining whether the server generates the random variable and the second verification hash code again during a predetermined time;
when the server generates the random variable and the second verification hash code again, returning to the step of determining whether the random variable and the second verification hash code are correct; and
when the server does not generate the random variable and the second verification hash code again, returning to the step of generating the initial value by the client.

* * * * *